(12) United States Patent
Reuter

(10) Patent No.: US 12,046,968 B2
(45) Date of Patent: Jul. 23, 2024

(54) WINDING SCHEME FOR AN ELECTRIC MACHINE

(71) Applicant: ZF FRIEDRICHSHAFEN AG, Friedrichshafen (DE)

(72) Inventor: Stefan Reuter, Hammelburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 258 days.

(21) Appl. No.: 17/765,493

(22) PCT Filed: Sep. 24, 2020

(86) PCT No.: PCT/EP2020/076743
§ 371 (c)(1),
(2) Date: Mar. 31, 2022

(87) PCT Pub. No.: WO2021/063802
PCT Pub. Date: Apr. 8, 2021

(65) Prior Publication Data
US 2022/0360128 A1    Nov. 10, 2022

(30) Foreign Application Priority Data
Oct. 1, 2019    (DE) ............... 10 2019 215 094.2

(51) Int. Cl.
*H02K 3/28*    (2006.01)
(52) U.S. Cl.
CPC ........... *H02K 3/28* (2013.01); *H02K 2213/03* (2013.01)
(58) Field of Classification Search
CPC .................. H02K 3/28; H02K 2213/03
USPC ........................................ 310/208
See application file for complete search history.

(56) References Cited

U.S. PATENT DOCUMENTS

| 2,627,040 | A  | * | 1/1953 | Siegfried | H02K 37/04 318/498 |
| 6,477,762 | B1 | * | 11/2002 | Sadiku | H02K 15/0478 242/432.6 |
| 2018/0034334 | A1 | * | 2/2018 | Neet | H02K 3/28 |

FOREIGN PATENT DOCUMENTS

| DE | 102014105428 | 10/2014 |
| DE | 102014223202 | 5/2016 |
| DE | 102018203469 | 9/2018 |
| DE | 102018125829 | 4/2020 |
| DE | 102018125831 | 4/2020 |
| WO | WO 2007146252 | 12/2007 |
| WO | WO 2019130747 | 7/2019 |
| WO | WO-2019130747 A1 * | 7/2019 ......... H02K 15/0081 |

(Continued)

OTHER PUBLICATIONS

Machine translation of WO-2019130747-A1 ; Miyawaki (Year: 2019).*
Office Action of corresponding German Patent Application No. 10 2019 215 094.2.

*Primary Examiner* — Terrance L Kenerly
(74) *Attorney, Agent, or Firm* — Cozen O'Connor

(57) ABSTRACT

A wave winding for an electric machine in which a quantity of coil strands are provided connected in parallel. Each partial strand is a plurality of hairpins. Two different variants of hairpins are provided. A first variant in the turn region W has a winding step WK between the conductor elements which is shortened by one and in a second variant of the hairpins the turn region has a lengthened winding step that is greater than the shortened winding step. In all of the variants of the hairpins the contact regions are deformed by one half of the standard winding step in direction opposite the turn region.

14 Claims, 2 Drawing Sheets

(56) References Cited

FOREIGN PATENT DOCUMENTS

| WO | WO 2019170349 | 9/2019 |
| WO | WO 2019170350 | 9/2019 |

\* cited by examiner

WINDING SCHEME FOR AN ELECTRIC MACHINE

CROSS REFERENCE TO RELATED APPLICATIONS

This is a U.S. national stage of Application No. PCT/EP2020/076743 filed Sep. 24, 2020. Priority is claimed on German Application No. DE 10 2019 215 094.2 filed Oct. 1, 2019 the content of which is incorporated herein by reference.

BACKGROUND OF THE INVENTION

1. Field of the Invention

The present disclosure is directed to a winding arrangement for an electric machine and an electric machine with a corresponding winding.

2. Description of Related Art

It is known from the prior art, for example from DE 10 2014 223 202 A1, that distributed windings with a plurality of strands of conductors distributed along the circumference are provided in an electric machine. A further example of the prior art is shown in WO 2007/146252.

SUMMARY OF THE INVENTION

An object of one aspect of the present invention is a winding arrangement that is simple and fast to produce and enables an operation of the electric machine with high output and low losses. A further aspect is minimizing a required installation space as far as possible, particularly in axial direction.

According to one aspect of the invention, a wave winding for an electric machine with at least one phase and a number of slots q of at least three, in which the wave winding has a standard winding step WS of WS=q*m, where q corresponds to the number of slots and m corresponds to the quantity of phases, in which at least a quantity of coil strands corresponding to the number of slots q is provided connected in parallel, in which the coil strands have in each instance at both ends thereof a connection pin and comprise in each instance a plurality of partial strands connected in series, in which each partial strand stretches once around a circumference of the wave winding, in which each partial strand is formed by a plurality of hairpins, in which each hairpin comprises two conductor elements adjacent in circumferential direction and connected in each instance through a turn region W, in which each hairpin has at the ends thereof contact regions K which are constructed in each instance as contact pin for connecting to an adjacent hairpin or as connection pin, is characterized in that two different variants of hairpins are provided, in that, in a first variant of the hairpins, the turn region W has a winding step WK between the conductor elements which is shortened by one, that is, WK=WS−1, in that, in a second variant of the hairpins, the turn region W has a lengthened winding step WL which is greater than the shortened winding step WK by the number of slots q, that is, WL=WK+q, and in that, in all of the variants of the hairpins, the contact regions K are deformed in each instance by one half of the standard winding step WS in direction opposite the turn region W in order to achieve the standard winding step WS between interconnected conductor elements of adjacent hairpins.

One aspect of the invention comprises a wave winding, which is a distributed winding, in which the coils of the winding are distributed, respectively, over the circumference of the electric machine. The electric machine has at least one phase, although a plurality of phases, particularly three phases, can also be provided. A fixed quantity of magnetic poles is provided, these magnetic poles being distributed over a circumference of the electric machine. This quantity corresponds to the number of poles and is an even number, since there is an equal quantity of magnetic North poles and South poles. Either the rotor, or the stator, or the rotor and the stator of the electric machine have slots for receiving the wave winding. A plurality of coil strands connected in parallel can also be provided for each phase. The electric machine preferably has a number of slots of at least three, which means that a quantity of slots adjacent in circumferential direction corresponding to the number of slots is provided for each pole. The coil strands have in each instance at both ends thereof a connection pin and are divided in each instance into a plurality of partial strands connected in series. Each partial strand has a plurality of conductor elements corresponding to the number of poles of the electric machine and accordingly stretches once around the circumference. Two adjacent conductor elements are connected to one another in each instance by a turn region to form a hairpin. The conductor elements are received in layers in the slots, and two layers adjacent in radial direction form a double layer in each instance, the conductor elements of a partial strand preferably being arranged in a double layer.

Each hairpin has contact regions at its free ends. The turn region is preferably formed integrally with the conductor elements in each instance. In order to connect adjacent hairpins to one another, the contact region is constructed as a contact pin connected to a corresponding contact pin of an adjacent hairpin of the coil strand for an electrically conductive connection, for example, welding. The contact region can also be constructed as a connection pin which is formed to connect the coil strand, more precisely the two ends of a coil strand, to power electronics for controlling the electric machine. The contact pins and connection pins advantageously have the same geometrical form so that there is a smaller quantity of different parts, which reduces costs and assembly effort. Different geometries are also possible in order, for example, to facilitate connection to the power electronics.

Wave windings according to one aspect of the invention have two different variants of hairpins. For this purpose, in a first variant of the hairpins, the turn region has a shortened winding step WK between the conductor elements. The shortened winding step WK is shorter by one than a theoretical standard winding step WS, which shows the distance between the slots of the conductor elements on the theoretical value of the product of the number of slots multiplied by the quantity of phases in which the same slot position, for example, right, center, or left, is always occupied for each pole when a number of slots is three. A change between the slots is achieved by the shortened winding step WK. Because of the relationship WK=WS−1, where WK represents the shortened winding step and WS represents the standard winding step, a change of the conductor elements of a partial strand between adjacent slots of the consecutive poles connected via the turn region of the hairpin is carried out by the first variant of hairpins. Accordingly, depending on the viewing direction and a number of slots of three, a change from a right slot to a middle slot or from a middle slot to a left slot takes place.

Therefore, hairpins in a second variant are also provided. The hairpins of the second variant have a lengthened winding step WL, which is greater than the shortened winding step WK by the value of the number of slots q. The lengthened winding step WL can also be represented by the formula WL=WK+q, where q represents the value of the number of slots, WL represents the lengthened winding step of the second variant of hairpins, and WK represents the shortened winding step of the first variant of hairpins. As a result of these hairpins with a lengthened winding step WL, a change occurs between the outer slot positions of consecutive conductor elements from the left slot to the right slot, where the designations "left" and "right" depend on the viewing direction.

Both of the variants have in common that the contact regions are deformed in each instance by one half of the standard winding step WS in direction opposite the turn region in order to achieve the standard winding step WS between interconnected conductor elements of adjacent hairpins. In other words, according to one aspect of the invention, wave windings have a consistent winding step on the axial side of the contact regions for all of the layers so that the production and connection, for example, by welding, of the corresponding contact regions to one another is facilitated. The deformation is carried out for each layer alternately in opposite circumferential direction, since the conductor elements of each hairpin are arranged in different layers of a double layer.

Embodiment forms of a wave winding are characterized in that the turn region W of the hairpins with lengthened winding step WL protrudes axially farther over a coil body than the turn region W of the hairpins with a shortened winding step WK. The turn regions of the hairpins connect the conductor elements in the slots of the coil body at one axial end of the coil body. The turn regions of the hairpins with shortened winding step can be arranged adjacent one another and formed with a like, preferably small, height. The turn regions of the hairpins with a lengthened winding step protrude axially farther over the coil body and span the turn regions with a shortened winding step.

Wave windings according to embodiment forms are characterized in that at least one hairpin with lengthened winding step WL and at least two hairpins with a shortened winding step WK are provided for each partial strand. For reasons of advantageous symmetry, each partial strand on the average has a distance between the conductor elements which corresponds to the standard winding step. For this purpose, a quantity of hairpins with shortened winding step corresponding to the number of slots minus one (−1) is provided for each hairpin with a lengthened winding step. Accordingly, the quantity of hairpins preferably satisfies the relationship of equation n=m*(q−1), where n is the quantity of hairpins of a first variant with shortened winding step, m is the quantity of hairpins of a second variant with lengthened winding step, and q represents the number of slots.

Embodiment forms of a wave winding are characterized in that, for each partial strand, additionally at least one hairpin of a third variant is provided which has a turn region W with a standard winding step WS. In this way, depending on construction, longer partial strands can also be provided in which the average winding step corresponds to the standard winding step.

Embodiment forms of a wave winding are characterized in that, for each partial strand, the conductor elements run through each of the slots associated with the number of slots the same number of times. In this way, a high degree of symmetry is achieved for the coil strands, which is advantageous, inter alia, with respect to reduced losses. In the event that hairpins of a third variant are provided, they are provided in a quantity corresponding to the number of slots or a multiple thereof and are preferably arranged in each instance between the hairpins of the first variant and the hairpins of the second variant.

Wave windings according to embodiment forms are characterized in that an integral multiple of parallel-connected coil strands are provided. Coils advantageously have a plurality of parallel strands. For each phase, the same number of parallel strands are preferably provided in each instance, for which reason there is provided an integral multiple of the number of phases on parallel strands.

Embodiment forms of a wave winding are characterized in that the connection pins of the parallel coil strands are arranged in the same pole in each instance. As a result of the arrangement in the same pole, the expenditure on an interconnection of the coil strands can be simplified and carried out smaller. Accordingly, installation space can be saved.

Wave windings according to embodiment forms are characterized in that the two connection pins of a coil strand are arranged in the same layer. It is also possible to economize on installation space when the two connection pins of a coil strand are arranged in a same, preferably outer, layer because, in this way, the interconnection can be made smaller or can be arranged from only one side, or the connection pins can simply be deformable in radial direction.

Alternative embodiment forms of wave windings are characterized in that the two connection pins of a coil strand are arranged in directly adjacent layers of a double layer. Apart from the deformability in radial direction, these embodiment forms have the same advantages as those mentioned above with an arrangement in one layer.

Further alternative embodiment forms of a wave winding are characterized in that one of the two connection pins of a coil strand is arranged respectively in the radially inner layer and in the radially outer layer. As a result of an arrangement of this kind, the connection pins are also easily accessible and it is possibly sufficient that the coil strands only run through the coil body in radial direction once.

Embodiment forms of wave windings are characterized in that a portion of each coil strand which comprises at least one partial strand is wound in opposite circumferential direction, in that the change of direction of the winding takes place between the partial strands in an outer layer in radial direction, in that the connection between the portions of the coil strand with different direction of winding is formed by a bridge element or a contact region K, which is deformed in radial direction and opposite circumferential direction, which are electrically conductively connected to the contact regions K of the hairpins.

Because of the reversal of the direction of winding, losses are further reduced, since a greater symmetry of the wave winding is achieved.

Through the use of bridge elements, the uniform deformation of the contact regions of the hairpins can be maintained, which facilitates production and an electrically conducting connection between the corresponding partial strands can be achieved at the same time. As a result of the bridge element, a connection can easily be produced via a required circumferential region. A further advantage consists in that, depending on the available installation space for the electric machine, the bridge element is arranged either with an axial orientation or particularly preferably with a radial orientation.

Alternatively, instead of a bridge element, one of the corresponding contact regions can also be deformed radially outward and in opposite circumferential direction to achieve a direct connection between the contact regions. In this way, the process of deforming the contact regions, while somewhat more complicated, does away with the need for the bridge elements and positioning thereof.

Further subject matter of one aspect of the invention is a stator or a rotor for an electric machine characterized in that the stator is provided with a wave winding according to the above description and an electric machine in which a wave winding according to the preceding description is provided.

The features of the embodiment forms can be combined in any way.

BRIEF DESCRIPTION OF THE DRAWINGS

The invention will be explained in more detail in the following referring to drawings. Like or similar elements are designated with consistent reference numerals. In particular, the drawings show.

DETAILED DESCRIPTION OF THE PRESENTLY PREFERRED EMBODIMENTS

Figure 1:
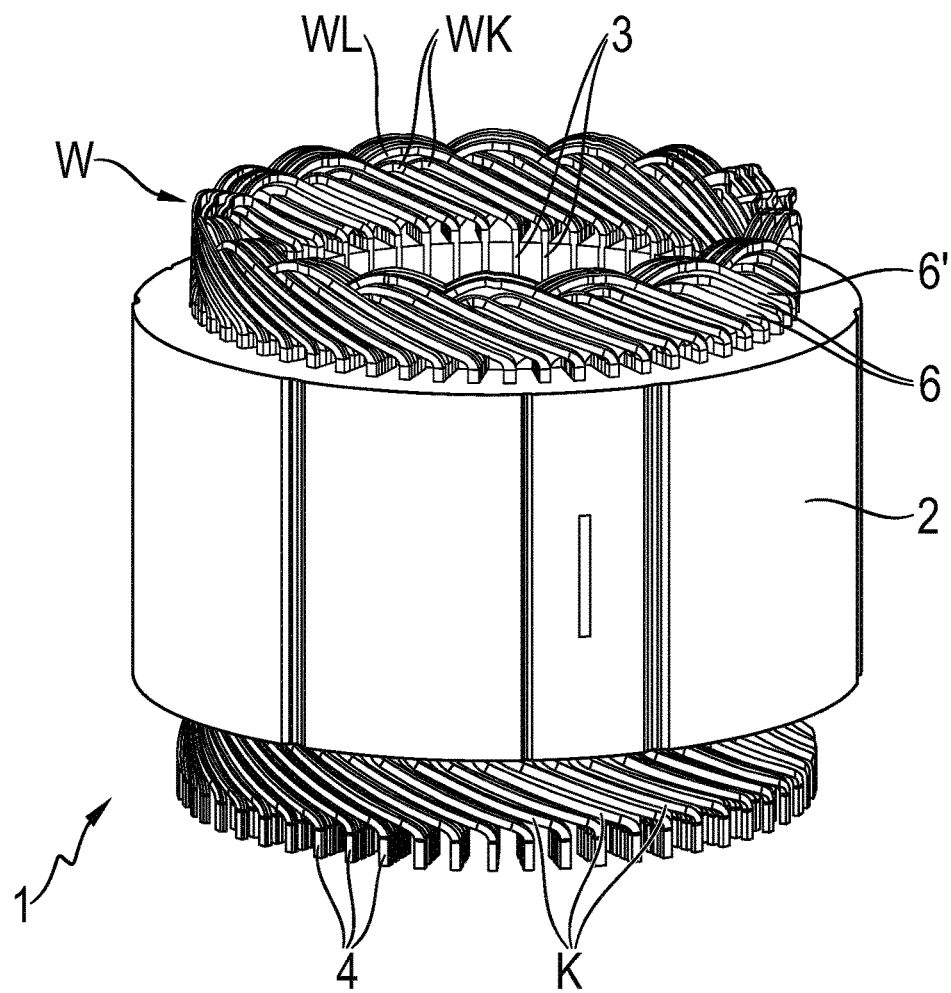
FIG. 1 is a coil with a wave winding in a perspective view.

FIG. 1 shows an example of a coil body with a wave winding 1, in this case as a stator. The stator has a coil body 2 in which slots 3 are formed for receiving the wave winding. Conductor elements in the form of hairpins 6, 6' in the depicted example are inserted into the slots 3, a plurality of conductor elements being inserted in layers for each slot 3.

The hairpins 6, 6' in the depicted example comprise in each instance two conductor elements, a turn region W in which the conductor elements are integrally connected to one another, and contact regions K at the ends of the hairpins 6, 6'. With the exception of the first and last hairpins 6, 6' of the individual coil strands, the hairpins 6, 6' are formed in their contact regions K with two contact pins 4, which are electrically conductively connected in each instance to the adjacent hairpin 6, 6' in the coil strand or, more precisely, the corresponding contact pin 4 thereof. The first and last hairpin 6, 6', respectively, of a coil strand has a contact pin 4 for connecting to the adjacent hairpin 6, 6' of the coil strand and a connection pin 5 for connecting to power electronics, not shown.

To enable mutual contacting, all of the contact pins 4 of the wave winding are arranged on the same axial side of the coil body 2 so that the turn regions W of the hairpins 6, 6' are correspondingly arranged on the opposite axial side of the coil body 1.

On the side of the turn regions W, a uniform pattern forms with parallelly running turn regions W with a shortened winding step WK which are bridged in each instance by a turn region W with lengthened winding step WL. A quantity of hairpins 6 of the first variant with shortened winding step WK which corresponds to the number of slots q minus one (−1) and a hairpin 6' of the second variant with lengthened winding step WL are provided adjacent for each pole. Accordingly, in the depicted embodiment example with a number of slots of three, two hairpins 6 of the first variant and one hairpin 6' of the second variant. By the hairpins 6 of the first variant, a change always takes place from the right slot 3 to a middle slot 3 or from a middle slot 3 to a left slot 3 of the adjacent layer. With the hairpin 6' of the second variant, there is always a change between a left slot 3 and a right slot 3 of the adjacent layer.

Figure 2:
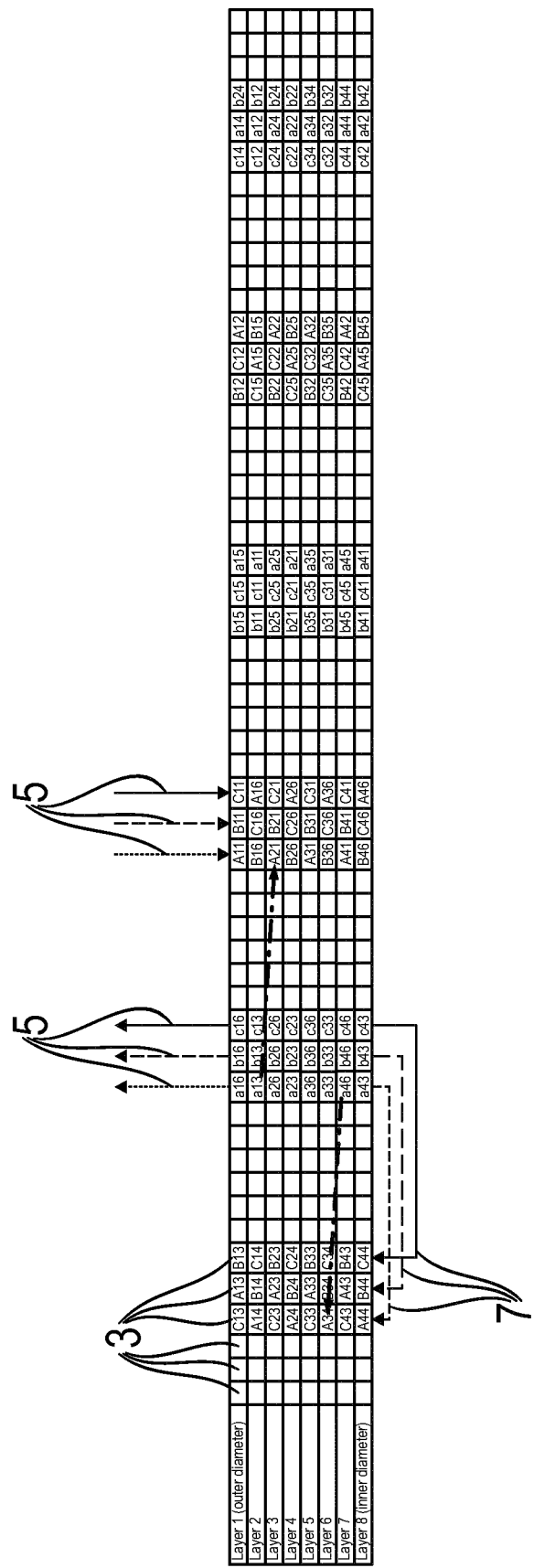
FIG. 2 is a winding arrangement for a coil strand.

FIG. 2 shows a winding scheme for a first coil strand analogous to an example shown in FIG. 1 with a number of slots of three, wherein an embodiment example with 54 slots 3 is shown.

A developed view of the slots 3 is shown with layers, eight layers in this case, and therefore four double layers per slot 3. However, a different quantity of slots 3 or layers, for example, six layers is also possible.

Shown in the layers are only the conductor elements of the hairpins 6, 6' for parallel partial strands of a pole in the three respective slots 3 per pole. The conductor elements are numbered in such a manner that the number comprises an alphabetic character for the partial strand and a two-digit number. The two conductor elements of the respective hairpin 6, 6' are distinguished by uppercase and lowercase alphabetic characters, respectively. The first digit of the two-digit number indicates the double layer in which the hairpin 6, 6' is arranged, and the second digit stands for a consecutive numbering of the hairpins 6, 6' in the direction of current flow in this double layer. The conductor elements adjacent the connection pins 5 or, in other words, the corresponding first conductor element and last conductor element of the coil strands, are designated by arrows which are shown in solid lines, dashed lines and dotted lines to distinguish the different strands.

The connection pins 5 of the individual coil strands are provided in the depicted example in the radially outer layer of the wave winding, and the connection pins 5 of the parallel coil strands are arranged in the same pole, respectively. Because of the arrangement in the radially outer layer, a connection can be made to the power electronics in radial direction so that only minimal installation space, if any, is needed in axial direction. Because of the arrangement in the same pole, the connection pins 5 for the cathode and the anode are arranged directly adjacent. The connection pins 5 of the parallel coil strands for the cathode and the anode are arranged offset in circumferential direction by a pole of the coil strand. Because of this configuration, only a small area of the circumference is required for the connection to the power electronics.

Through the turn regions W, a change is carried out in the depicted example from a left slot 3 to a right slot 3 distributed over the circumference in that a hairpin 6' of the second variant with a lengthened winding step WL is provided. In the depicted embodiment example, two hairpins 6 of the first variant with shortened winding step WK are provided in the rest of the partial strand of the respective coil strand to change from a right slot 3 to a middle slot 3 or from a middle slot 3 to a left slot 3. In the depicted example, only hairpins 6, 6' of the first and second variants are provided. In this way, a higher degree of symmetry is achieved, which reduces losses. Depending on the quantity of poles and the like, a different distribution of the hairpins 6, 6' of different variants along the circumference is also possible. Hairpins of a third variant with a standard winding step WS can also be provided.

As is shown in FIG. 2, the coil strands first run through the radially outer double layer with the first partial strand in each instance. The first partial strand passes into the second partial strand through a corresponding connection of the contact pins 4, this second partial strand running through the next double layer in the same direction of winding analogous to the first partial strand. This passage between the double layers is indicated by way of example in FIG. 2 by an arrow with a dash-dot line. In this manner, initially the slots 3 of the double layers are traversed with a same direction of winding from radially outward to radially inward.

At the last contact pin 4 of the partial strand, in this case the fourth partial strand in the radially inner layer, the electrically conducting connection to the first contact pin 4 of the partial strand, in this case the fifth partial strand, is produced in each instance by a bridge element 7.

In this connection via the bridge element, a reversal of direction of the winding takes place. In the depicted example, a winding step corresponding to the standard winding step WS is carried out by the bridge element 7.

Alternatively, bridge elements 7 with different winding steps corresponding, for example, to the lengthened winding step or shortened winding step are also possible in order to change between the slots 3 during the transition between the partial strands.

Also, as an alternative to a separate bridge element 7, it is possible that the corresponding last contact pin 4 or first contact pin 4 is deformed in radial direction into an imaginary further layer, and this is deformed in a circumferential direction opposite to the original layer in order to connect directly to the corresponding contact pin 4 in the manner of the further contact pins 4, for example, by welding.

The partial strand, in this case the fifth partial strand, which runs through the slots in the radially inner double layer in opposite direction subsequently passes into the sixth partial strand which likewise passes through the slots 3 in the adjacent double layer. This passage is likewise indicated by way of example by an arrow with dash-dot line. The partial strands running back to the radially outer layer have a configuration analogous to the above-mentioned partial strands. The last hairpin of the partial strand, in this case the eighth partial strand, correspondingly has at the end thereof, which also represents the end of the coil strand, the contact pin 5 for connecting to the power electronics.

The invention is not limited to this configuration. As was mentioned above, individual advantageous features only may also be provided. Embodiment forms with a different quantity of double layers and the like are also possible.

Embodiment forms in which connection pins 5 are provided at the radially inner layer or embodiment forms in which connection pins 5 are provided both at the radially outer layer and radially inner layer are also possible.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A wave winding for an electric machine with at least one phase and at least three slots,
wherein the wave winding has a standard winding step WS of $WS = q*m$, where q is a number of slots and m corresponds to a quantity of phases,
a quantity of coil strands corresponding to the number of slots q is provided that are connected in parallel,
wherein each coil strands comprises:
a connection pin at both ends; and
a plurality of partial strands connected in series,
wherein each partial strand stretches once around a circumference of the wave winding,
wherein each partial strand is formed by a plurality of hairpins, each hairpin comprises two conductor elements adjacent in circumferential direction and connected through a turn region W,
contact regions K, which are constructed as contact pin configured to connect to an adjacent hairpin or as a connection pin are arranged at respective ends of each hairpin,
wherein the hairpins comprise:
a first variant of the hairpins, wherein the turn region W has a winding step WK between the conductor elements which is shortened by one, such that $WK = WS - 1$; and
a second variant of the hairpins, wherein the turn region W has a lengthened winding step WL which is greater than the shortened winding step WK by the number of slots q, such that $WL = WK + q$,
wherein in the first and second variant of the hairpins, the contact regions K are deformed by one half of the standard winding step WS in a direction opposite the turn region W to achieve the standard winding step WS between interconnected conductor elements of adjacent hairpins.

2. The wave winding according to claim 1, wherein the turn region W of the hairpins with lengthened winding step WL protrudes axially farther over a coil body than the turn region W of the hairpins with a shortened winding step WK.

3. The wave winding according to claim 1, wherein at least one hairpin with the lengthened winding step WL and at least two hairpins with the shortened winding step WK are provided for each partial strand.

4. The wave winding according to claim 1, wherein, for each partial strand, additionally at least one hairpin of a third variant is provided which has a turn region W with a standard winding step WS.

5. The wave winding according to claim 1, wherein, for each partial strand, the conductor elements run through respective slots associated with the number of slots a same number of times.

6. The wave winding according to claim 1, wherein an integral multiple of parallel-connected coil strands are provided.

7. The wave winding according to claim 1, wherein the connection pins of the parallel coil strands are arranged in a same pole in each instance.

8. The wave winding according to claim 1, wherein the two connection pins of a coil strand are arranged in a same layer.

9. The wave winding according to claim 1, wherein the two connection pins of a coil strand are arranged in directly adjacent layers of a double layer.

10. The wave winding according to claim 1, wherein one of the two connection pins of a coil strand is arranged respectively in a radially inner layer and in a radially outer layer.

11. The wave winding according to claim 1, wherein a portion of each coil strand which comprises at least one partial strand is wound in a direction opposite circumferential direction, in that a change of direction of the winding takes place between the partial strands in an outer layer in radial direction, in that the connection between the portions of the coil strand with the different direction of winding is formed by a bridge element or a contact region K which is deformed in radial direction and opposite circumferential direction, which are electrically conductively connected to the contact regions K of the hairpins.

12. A stator for an electric machine, wherein the stator is provided with a wave winding with at least one phase and at least three slots,
   wherein the wave winding has a standard winding step WS of WS=q*m, where q corresponds to a number of slots and m corresponds to a quantity of phases,
   a quantity of coil strands corresponding to the number of slots q is provided that are connected in parallel, wherein each coil strands comprises:
     a connection pin at both ends; and
     a plurality of partial strands connected in series,
     wherein each partial strand stretches once around a circumference of the wave winding,
     wherein each partial strand is formed by a plurality of hairpins, each hairpin comprises two conductor elements adjacent in circumferential direction and connected through a turn region W,
     contact regions K, which are constructed as contact pin configured to connect to an adjacent hairpin or as a connection pin are arranged at respective ends of each hairpin,
     wherein the hairpins comprise:
     a first variant of the hairpins, wherein the turn region W has a winding step WK between the conductor elements which is shortened by one, such that WK=WS−1; and
     a second variant of the hairpins, wherein the turn region W has a lengthened winding step WL which is greater than the shortened winding step WK by the number of slots q, such that WL=WK+q,
     wherein in the first and second variant of the hairpins, the contact regions K are deformed by one half of the standard winding step WS in a direction opposite the turn region W to achieve the standard winding step WS between interconnected conductor elements of adjacent hairpins.

13. A rotor for an electric machine, wherein the rotor is provided with a wave winding with at least one phase and at least three slots,
   wherein the wave winding has a standard winding step WS of WS=q*m, where q corresponds to a number of slots and m corresponds to a quantity of phases,
   a quantity of coil strands corresponding to the number of slots q is provided that are connected in parallel, wherein each coil strands comprises:
     a connection pin at both ends; and
     a plurality of partial strands connected in series,
     wherein each partial strand stretches once around a circumference of the wave winding,
     wherein each partial strand is formed by a plurality of hairpins, each hairpin comprises two conductor elements adjacent in circumferential direction and connected through a turn region W,
     contact regions K, which are constructed as contact pin configured to connect to an adjacent hairpin or as a connection pin are arranged at respective ends of each hairpin,
     wherein the hairpins comprise:
     a first variant of the hairpins, wherein the turn region W has a winding step WK between the conductor elements which is shortened by one, such that WK=WS−1; and
     a second variant of the hairpins, wherein the turn region W has a lengthened winding step WL which is greater than the shortened winding step WK by the number of slots q, such that WL=WK+q,
     wherein in the first and second variant of the hairpins, the contact regions K are deformed by one half of the standard winding step WS in a direction opposite the turn region W to achieve the standard winding step WS between interconnected conductor elements of adjacent hairpins.

14. An electric machine, wherein at least one wave winding with at least one phase and at least three slots,
   wherein the wave winding has a standard winding step WS of WS=q*m, where q corresponds to a number of slots and m corresponds to a quantity of phases,
   a quantity of coil strands corresponding to the number of slots q is provided that are connected in parallel, wherein each coil strands comprises:
     a connection pin at both ends; and
     a plurality of partial strands connected in series,
     wherein each partial strand stretches once around a circumference of the wave winding,
     wherein each partial strand is formed by a plurality of hairpins, each hairpin comprises two conductor elements adjacent in circumferential direction and connected through a turn region W,
     contact regions K, which are constructed as contact pin configured to connect to an adjacent hairpin or as a connection pin are arranged at respective ends of each hairpin,
     wherein the hairpins comprise:
     a first variant of the hairpins, wherein the turn region W has a winding step WK between the conductor elements which is shortened by one, such that WK=WS−1; and
     a second variant of the hairpins, wherein the turn region W has a lengthened winding step WL which is greater than the shortened winding step WK by the number of slots q, such that WL=WK+q,
     wherein in the first and second variant of the hairpins, the contact regions K are deformed by one half of the standard winding step WS in a direction opposite the turn region W to achieve the standard winding step WS between interconnected conductor elements of adjacent hairpins.

\* \* \* \* \*